(12) United States Patent
Bond et al.

(10) Patent No.: US 6,249,627 B1
(45) Date of Patent: Jun. 19, 2001

(54) ARRANGEMENT FOR SELF-ALIGNING OPTICAL FIBERS TO AN ARRAY OF SURFACE EMITTING LASERS

(75) Inventors: Aaron Eugene Bond, Salisbury Township; Mindaugas Fernand Dautartas, Alburtis; George John Przybylek, Douglasville, all of PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/394,634

(22) Filed: Sep. 13, 1999

(51) Int. Cl.[7] .................................................. G02B 6/30
(52) U.S. Cl. ................. 385/49; 385/52; 385/50; 385/131; 372/108
(58) Field of Search .................. 385/52, 49, 50, 385/14, 131; 372/108

(56) References Cited

U.S. PATENT DOCUMENTS 5,247,597 * 9/1993 Blacha et al. ............................ 385/49
5,796,714 * 9/1998 Chino et al. .......................... 370/349

* cited by examiner

*Primary Examiner*—Darren Schuberg
*Assistant Examiner*—Fayez Assaf
(74) *Attorney, Agent, or Firm*—Wendy W. Koba, Esq.

(57) ABSTRACT

An arrangement for providing attachment and alignment between an array of surface emitting lasers and an array of optical fibers utilizes a first substrate for supporting the laser array and a second substrate for supporting the fibers. The second substrate is formed to including a plurality of apertures that are disposed to self-align with the laser array upon attachment. Alignment fiducials may be formed on both substrates to facilitate the alignment.

8 Claims, 2 Drawing Sheets

ARRANGEMENT FOR SELF-ALIGNING OPTICAL FIBERS TO AN ARRAY OF SURFACE EMITTING LASERS

TECHNICAL FIELD

The present invention relates to an arrangement for aligning a communication fiber to a surface emitting laser and, more particularly, to an arrangement that provides self-alignment between an array of surface emitting lasers and an array of optical fibers.

BACKGROUND OF THE INVENTION

A vertical cavity surface emitting laser has a configuration of a cavity comprising an active layer made of GaAs and GaInAs sandwiched by a mirror above the active layer and an underlayer mirror on the substrate side beneath the active layer. In comparison with an edge emitter semiconductor laser, the length of the cavity is extremely short. It is thus necessary to make laser oscillation easy to generate by setting the reflectivity of each of the mirrors at a very high value of equal to or greater than 99%. For this reason, a distributed Bragg reflector (DBR) is normally used as a mirror. The distributed Bragg reflector is created from layers of low-refractivity materials made of AlAs and layers of high-refractivity materials made of GaAs. The low-refractivity and high-refractivity materials are stacked on each other alternately with a period of ¼ of the wavelength.

The vertical cavity surface emitting laser is expected to be a key device for realizing large capacity optical communication by transmitting optical information in parallel through a plurality of laser devices arranged in an array. A mounting technology for interconnecting an array of these surface emitting lasers with a suitable array of optical fibers has become an area of study and development. One exemplary mounting arrangement is disclosed in U.S. Pat. No. 5,912,913 issued to M. Kondow et al. on Jun. 15, 1999. In this arrangement an array of surface emitting lasers are disposed on a first module and an array of optical fibers are positioned within a single large opening formed through a second module. There is no attempt to provide individual fiber-to-device alignment in the Kondow et al. arrangement, and it is presumed that the fiber array disposed within the opening will generally align with the laser array upon attachment of the two modules. In the case of an optical fiber having a core diameter of 50 µm and a device also having an optical emission diameter on the order of 50 µm, by setting the gap between the optical fiber and the laser at a value less than or equal to 10 µm, the Kondow et al. arrangement provides a coupling efficiency of only 50%.

An alternative arrangement that provides for improved alignment between an individual surface emitting laser and optical fiber is disclosed in U.S. Pat. No. 5,796,714 issued to T. Chino et al. on Aug. 18, 1998. In this arrangement, the laser substrate itself is etched through on the backside to create an opening (i.e., etch a via through a portion of the substrate material) for the optical fiber. While it is possible to provide improved alignment with this configuration, such an arrangement becomes problematic when utilized with an array of surface emitting lasers. In particular, any mismatch in forming the array of optical fiber vias not only results in misalignment between the lasers and the fibers, but since the vias are formed through the actual optical substrate, requires the entire array to be discarded, a costly and time-consuming result in a large volume manufacturing environment.

Thus, a need remains in the art for a packaging arrangement capable of providing an efficient and accurate alignment between an array of surface emitting lasers and an array of optical communication fibers.

SUMMARY OF THE INVENTION

The need remaining in the prior art is addressed by the present invention, which relates to an arrangement for aligning a communication fiber to a surface emitting laser and, more particularly, to an arrangement that provides self-alignment between an array of surface emitting lasers and an array of optical fibers.

In accordance with the present invention, an array of surface emitting lasers are formed upon (or subsequently attached to) a first substrate (for example, an InP substrate). A second, separate substrate (for example, a silicon substrate) is processed to form apertures for an array of optical fibers. In particular, the second substrate (also referred to below as the "fiber substrate") is etched through on both major surfaces to form vias from either side that meet to form the fiber apertures. The apertures are formed so as to accommodate the diameter of a typical communication fiber (for example, 125 µm). Advantageously, the use of conventional photolithographic techniques in forming the aperture array allows for the placement of the apertures on the second substrate to coincide precisely with the position of the lasers in the array on the first substrate. It is a feature of the present invention that any modification in the laser array (for example, decreasing the inter-laser spacing, changing the dimension of the array, etc.) can be easily accommodated by changing the mask used to define the locations of the fiber apertures on the second substrate.

In accordance with an aspect of the present invention, a self-aligning epoxy can be used to attach the substrates together, thus aiding in providing optimal alignment between the device array and fiber array. Alternatively, alignment fiducials can be formed on the both substrates so that the fiber substrate will "self-align" with the laser substrate upon attachment. In instances where the joined substrates are subsequently "diced" to form separate device/fiber subassemblies, a protective coating layer (such as a photoresist) may be used to prevent contamination of the substrates during sawing.

Other and further aspects of the invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
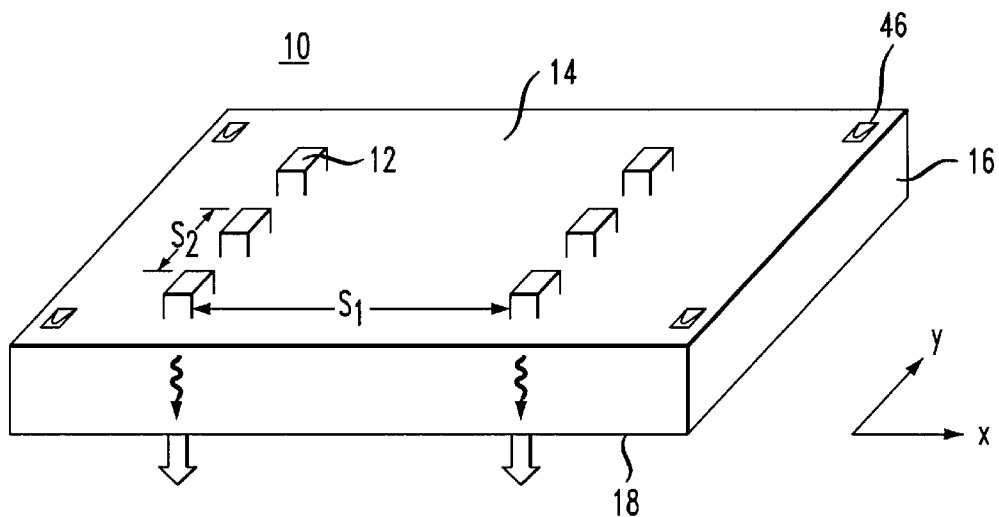
FIG. 1 illustrates an exemplary substrate supporting an array of surface emitting lasers.

An exemplary array 10 of surface emitting lasers 12 is illustrated in FIG. 1. In particular, individual surface emitting lasers 12 are shown as disposed on a top surface 14 of a substrate 16. In an exemplary embodiment, substrate 16 may comprise InP, the base material used in the formation of surface emitting lasers. In general, however, surface emitting lasers 12 may either be formed directly on substrate 16, or fabricated through a separate process and then disposed in the desired array pattern on surface 14 of substrate 16. It is to be understood that each individual laser 12 comprises a plurality of separate layers required to form the optoelectronic structure, the various required layers being well-known in the art and including an upper surface, a bottom surface and a semiconductor multi-layered structure including at least a light-emitting layer. Upon activation by an externally applied electrical bias (not shown), each laser 12 will emit an optical signal that will pass through the thickness of substrate 16 and exit through bottom major surface 18 of substrate 16, as indicated by the arrows in FIG. 1. Array 10 of FIG. 1, comprising a set of six surface emitting lasers 12, is considered to be exemplary only; any desired number of individual surface emitting lasers can be used in forming the array.

Figure 2:
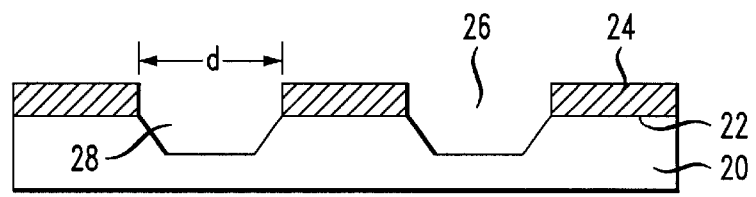
FIGS. 2–4 illustrate an exemplary process of forming an array of fiber apertures in a second substrate.

FIG. 2 illustrates a second substrate 20 as it is processed to be used as the fiber-supporting substrate. In one exemplary process, a silicon substrate may be used. It is to be understood however, that any other suitable material capable of being etched as described below may be used in practicing the present invention. Referring back to FIG. 2, a plurality of fiber apertures are formed by first covering a top major surface 22 of substrate 20 with a masking layer 24. As shown, masking layer 24 includes a plurality of windows 26 associated with the required openings that will provide alignment with the laser array of FIG. 1. That is, with an understanding of the x-y displacement of the laser array (denoted by the "spacings" $s_1$ and $s_2$ in FIG. 1), etch mask 24 can be formed to include windows 26 aligned with this spacing. The width of each window 26, denoted by the letter "d" in FIG. 2, is defined so as to allow the final aperture to accommodate the outer diameter of an optical fiber (conventional fibers having a diameter of, for example, 125 $\mu$m). Referring back to FIG. 2, substrate 20 is subjected to an anisotropic etch with an appropriate etchant (such as KOH or EDP) so as to form vias 28 and 30. It is to be understood that FIG. 2 is a cut-away side view of substrate 20, where during the single etch process an entire array of vias are simultaneously formed.

Figure 3:
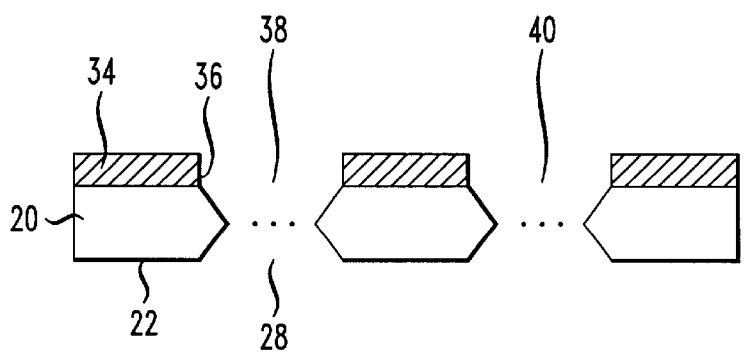

As shown, vias 28 and 30 do not completely etch through the thickness of substrate 20. In accordance with the present invention, it is necessary that the apertures be formed through the complete thickness of substrate 20. One method of forming these apertures is to similarly process bottom major surface 32 of substrate 20. FIG. 3 illustrates this step in the process, where a second mask layer 34 is disposed to cover bottom surface 32 of substrate 20 (first mask layer 24 having been removed upon completion of the first etch process). Second mask layer 34 is formed to include windows 36 that will align with the location of vias 28,30 (indeed, the entire array of vias) formed in the previous step. Again, the structure is etched, as shown in FIG. 3 so that the final fiber apertures, denoted 38, 40 in FIG. 3, extend through the complete thickness of substrate 20.

Figure 4:
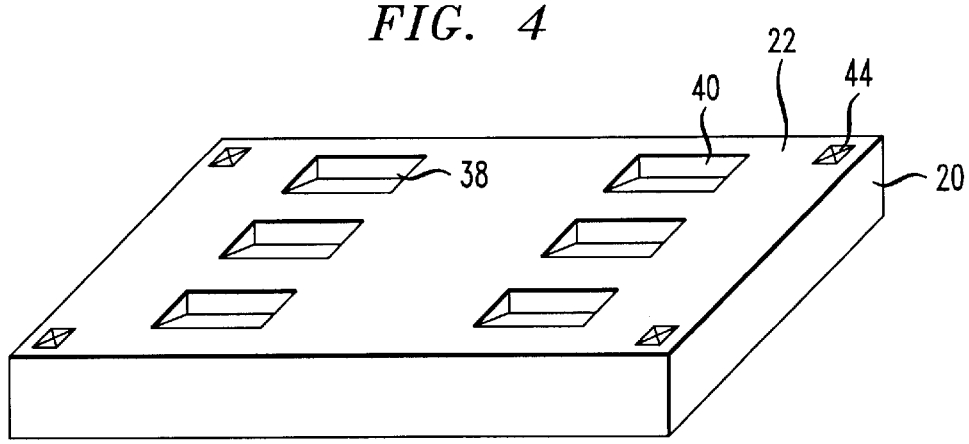
Figure 5:
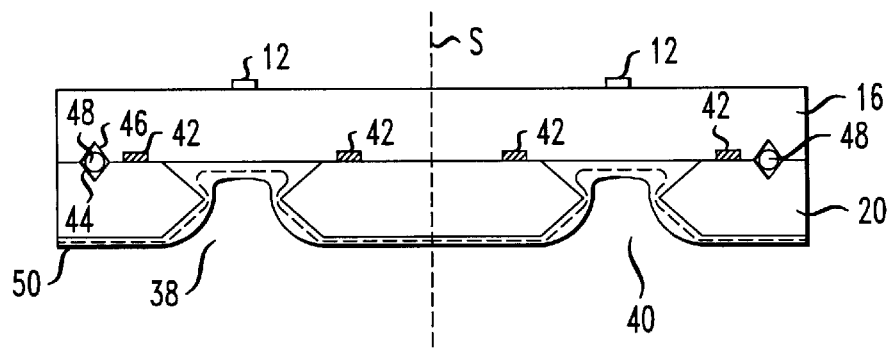
FIG. 5 is a view of the laser array substrate of FIG. 1 attached to the fiber aperture array as illustrated in FIG. 4, including a saw line for dicing the array into separate subassemblies.

An isometric view of fiber-supporting substrate 20 including a plurality of fiber apertures 38, 40 is shown in FIG. 4, where apertures 38, 40 are formed to align with the locations of individual surface emitting lasers 12 of array 10 (see FIG. 1). Once apertures 38, 40 are formed, the two substrates may be joined so as to align lasers 12 with apertures 38, 40. FIG. 5 contains a cut-away side view of laser substrate 16 attached to fiber substrate 20. In accordance with the present invention, any appropriate epoxy or other bonding material may be used to provide the physical attachment between the substrates. In a preferred embodiment, a plurality of solder bumps 42 may be used, where (as is well-known), the solder bumps can function to further refine the alignment between the substrates during a solder reflow step.

In an alternative alignment arrangement, a plurality of alignment fiducials can be formed on each substrate and used to self-alignment laser substrate 16 to fiber substrate 20. For example and with reference to FIG. 4, set of alignment fiducials 44 may be formed as pyramidal detents on top surface 22 of substrate 20. Referring to FIG. 1, laser substrate 16 may be formed to include, on bottom major surface 18, a comparable set of alignment fiducials 46. Therefore, when second substrate 20 is attached to first substrate 16, as shown in FIG. 5, the alignment fiducials will mate and ensure the "self-alignment" of fiber apertures 40 with laser array 10. Referring to FIG. 5, a plurality of sapphire alignment spheres 48 are illustrated as disposed between the aligned fiducials to provide for the alignment and mechanical attachment between substrates.

Once the substrates have been aligned and fixed in place, the bonded substrates may be diced so as to separate the lasers into separate components (if required). Alternatively, if the plurality of lasers are to be used in an array, the substrate may remain as a monolithic unit. An exemplary saw cut line S is shown in FIG. 5. In order to prevent any of the sawn substrate material from contaminating either substrate during the sawing operation, a protective coating layer 50 may be used to cover the surface being cut. FIG. 5 illustrates protective coating layer 50 as conformally coating the exposed surface area of substrate 20, presuming the saw used to dice the arrangement would cut through this substrate. Once the subassemblies have been separated, the photoresist material is removed.

Figure 6:
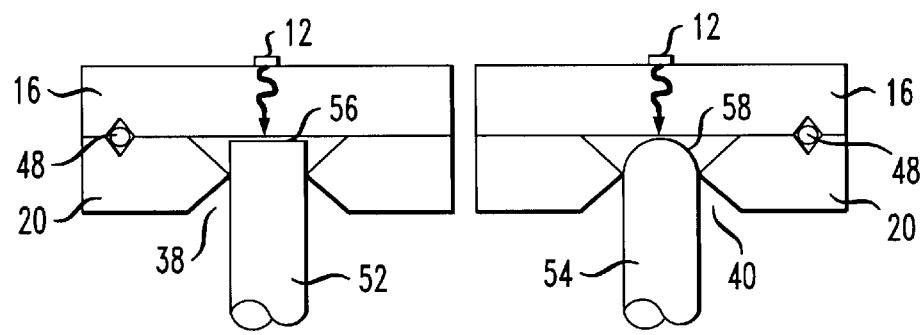
FIG. 6 illustrates a pair of subassemblies, separated as indicated in FIG. 5, with the inclusion of communication fibers in each fiber aperture.

FIG. 6 illustrates an exemplary pair of subassemblies subsequent to being diced apart. As shown, separate communication optical fibers 52, 54 may be inserted in place through apertures 38, 40, respectively. Therefore, fibers 52 and 54, upon insertion, will be aligned with the optical signal path of its associated surface-emitting laser 12. The communication fiber may include a flat endface 56, as shown in the left-hand portion of FIG. 6, or a rounded, lenses endface 58, as shown in the right-hand portion of FIG. 6. In either case, the use of a separate fiber-holding substrate formed to be self-aligned with a plurality of surface-emitting lasers in accordance with the present invention results in a relatively simple and inexpensive arrangement for facilitating the interconnection of the surface-emitting lasers and the fibers.

It is to be understood that various modifications may be made to the exemplary embodiment discussed above and still fall within the spirit and scope of the present invention. For example, other methods of forming the fiber apertures may be used, such as a reactive ion etch that would isotropically etch through the entire thickness of the second substrate without requiring separate "front side" and "back side" processing. Other materials besides InP and silicon may be used to form the first and second substrates (respectively), as well. Lastly, various other alignment techniques besides the illustrated pyramidal detents and spheres may be used to provide optical alignment and mechanical attachment between the substrates. In general, the spirit and scope of the present invention is considered to only be limited by the claims appended hereto.

What is claimed is:

1. An optical arrangement for aligning a surface emitting laser to an associated optical fiber, the arrangement comprising a first substrate including opposing top and bottom major surfaces and comprising a first plurality of alignment fiducials;

a plurality of surface emitting lasers disposed in an array on the top major surface of said first substrate, the optical output from said plurality of surface emitting laser thereafter passing through said first substrate and exiting at said bottom major surface;

a second substrate including opposing top and bottom major surfaces, said second substrate formed to include a plurality of apertures from said top major surface to said bottom major surface and a second plurality of alignment fiducials, wherein upon mating of the top major surface of said second substrate with the bottom major surface of said first substrate, said first plurality of alignment fiducials mate with said second plurality of alignment fiducials to form a mechanical attachment and optical alignment such that each aperture in the second substrate will align with a separate one of said plurality of surface emitting lasers disposed on said first substrate.

2. An optical arrangement as defined in claim 1 wherein the arrangement further comprises a plurality of optical fibers, a separate fiber disposed through one of the plurality of apertures included in the second substrate so as to be in optical communication with a separate one of the plurality of surface emitting lasers.

3. An optical arrangement as defined in claim 2 wherein the endface of each optical fiber proximate to its associated surface emitting laser comprises an essentially flat endface.

4. An optical arrangement as defined in claim 2 wherein the endface of each optical fiber proximate to its associated surface emitting laser comprises a rounded, lensed endface.

5. An optical arrangement as defined in claim 1 wherein the first substrate comprises InP.

6. An optical arrangement as defined in claim 1 wherein the second substrate comprises silicon.

7. An optical arrangement as defined in claim 6 wherein the plurality of apertures comprise a plurality of etched vias.

8. An optical arrangement as defined in claim 1 wherein the alignment fiducials comprise a first set of pyramidal detents etched in the bottom surface of the first substrate, a second set of pyramidal detents etched in the top surface of the second substrate, and a set of alignment spheres disposed between and attached to the aligned pyramidal detents of the first and second sets.

* * * * *